Patented Jan. 27, 1942

2,271,247

UNITED STATES PATENT OFFICE 2,271,247

OIL FIELD HOISTING BRAKE SYSTEM

Gerald G. Brown and Harvey Davidson, Wichita, Kans., assignors to Cardwell Manufacturing Company, Inc., Wichita, Kans.

Application July 26, 1940, Serial No. 347,749

8 Claims. (Cl. 188—204)

This invention relates to new and useful improvements in a safety brake system and has particular utility in hoisting machines, such as draw-works and servicing winches in oil field use, and similar equipment.

It is an object of our invention to provide a brake system composed of a plurality of brake drums with a light weight double bell-crank equalizer with a single adjustment which keeps all bands fully equalized under all adjustments when the brakes are applied.

It is another object of our invention to provide a braking system in which the brake band is self energizing and can be forcibly removed from the brake drum without any kick.

It is a further object of the invention to provide a safety means whereby sufficient braking power to prevent destruction of the mechanism will be produced even though the primary braking mechanism should fail.

It is a still further object of the invention to provide a safety mechanism in the brake equalizing means, such that in event part of the braking mechanism failed another portion would be operative.

The features of the invention will be described with reference to the drawings, in which, Figure 1 represents a perspective of the complete braking mechanism from which the support for the mechanism has been removed to show the details.

Figure 1:
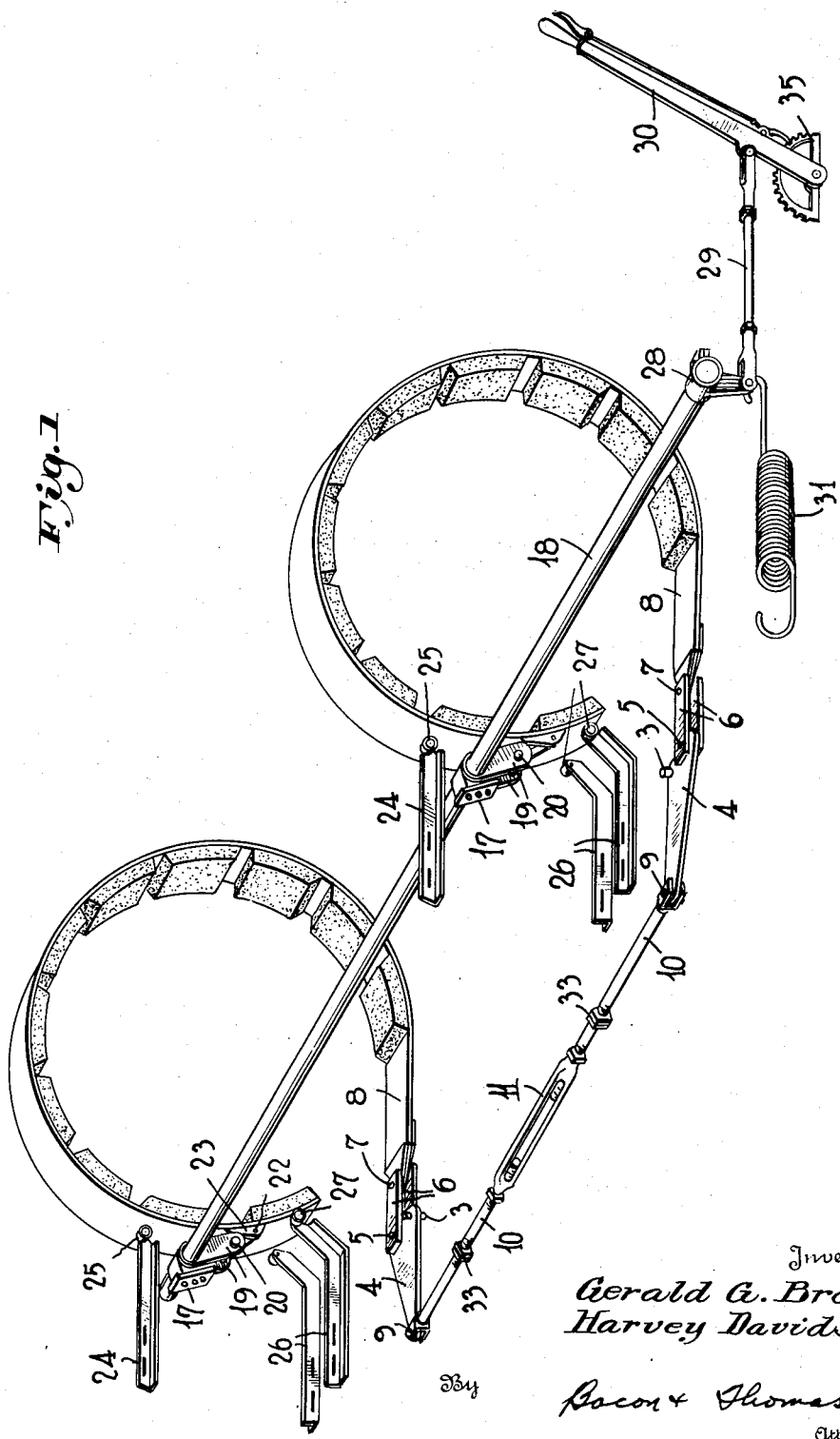

Numeral 1 designates the brake equalizer support beam, which is fixed to the frame members 15a in a suitable location. The beam carries the support lugs 2 through which the pivot pin 3 passes. The bell-crank 4 is pivoted on pin 3. To one arm of the bell-crank 4 by means of pin 5 is connected the links 6 which are secured by pin 7 to the anchored end of the brake-band 8. The tie rods 10 are secured to the opposite arm of the bell-crank 4 by pins 9; the tie rods 10 are adjustably held together by the turnbuckle 11. Bands 8 are lined with a frictional material. The frictional material could be on the brake rim 12.

Lugs 23 are attached to the actuated end of the brake-band 8. Pin 22 connects the compression link 21 to the lugs 23. The opposite end of link 21 is connected by pin 20 to the brake-shaft levers 19, which in turn are fixed to the brakeshaft 18. Brakeshaft 18 is rotatably supported by the bearings 17, which are secured to the bearing supports 16. Bearing supports 16 are fixed to the equalizer support beam 1.

Lever arm 28 is keyed, or otherwise secured to the brakeshaft 18. The link 29 connects the hand lever 30 to the lever arm 28. A spring 31 is also attached to the lever arm 28. The other end of spring 31 is adjustably secured to the frame member 15a. The hand lever 30 is adjustably held in the applied position by a ratchet segment 35 or other means.

It is to be understood that the brake rim 12 is fixed to the cable drum which rotates on shaft 13. Shaft 13 is mounted to the frame 15 by bearing supports 14.

The guide arms 24 are adjustably secured to the bearing supports 16. Rollers 25 are rotatably mounted on the guide arms 24. Guide arms 26 are adjustably secured to the support beam 1. Rollers 27 are rotatably mounted on guide arms 26.

Adjustment bolts 34 are placed in a band shield at intervals around the band, thereby limiting the release of the band from the brake rim.

Figure 3:
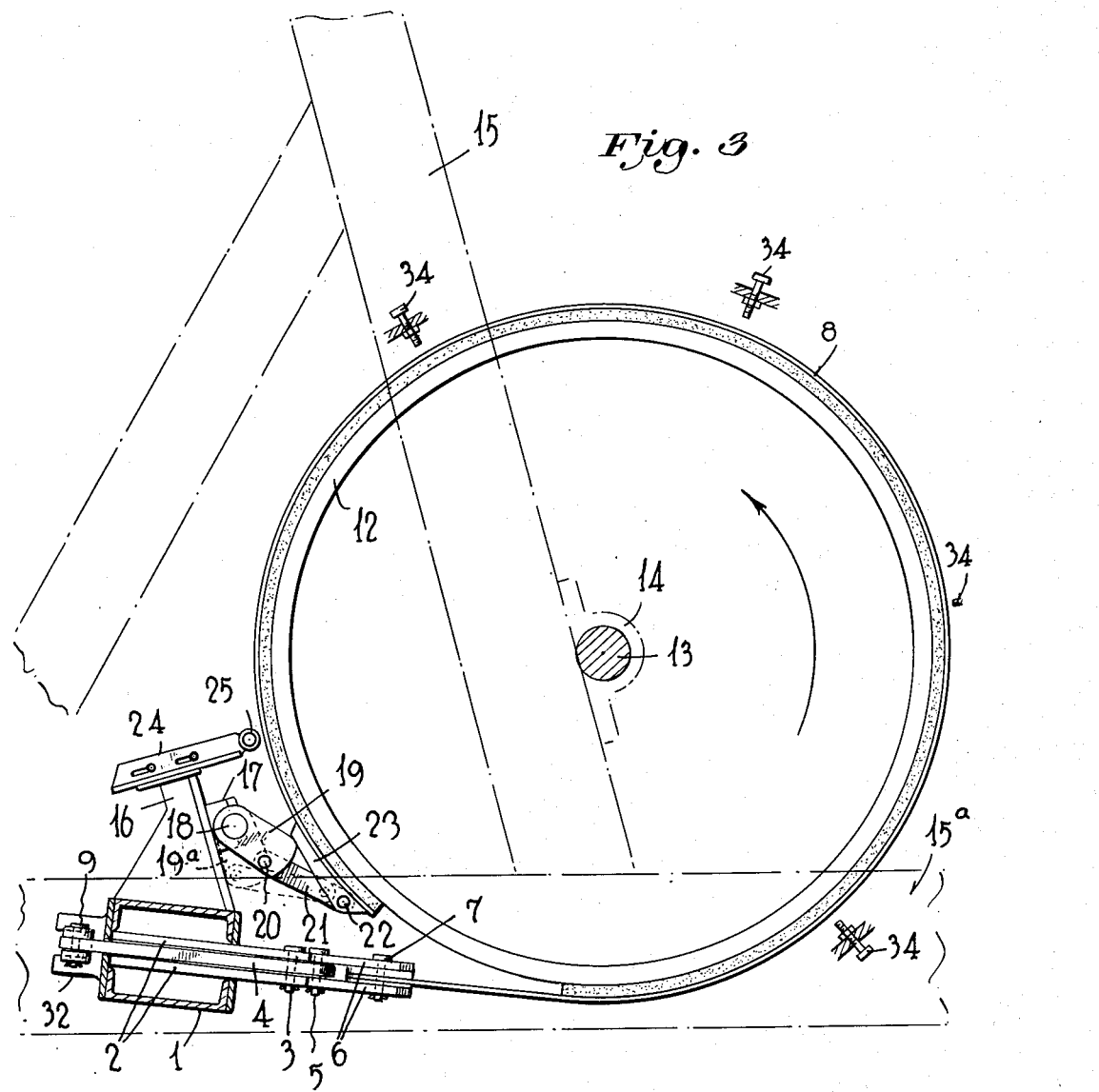
Figure 3 is an elevation view showing the frame of the hoist machine in dotted lines and the activating mechanism, drum, and brake rim in full lines.

As the hand lever 30 is moved toward the applied position, the brake shaft levers 19 are rotated toward the band. In so doing the band is tightened about the brake rim, giving a braking effect against the rotation of the cable drum. The arrow on the cable drum in Fig. 3 indicates the direction of rotation when the brakes are expected to perform their maximum work. It is apparent that as the brakes are applied, the band will tend to wrap tightly about the brake rim, self-energizing itself. A slight pressure on the hand lever will give a great braking effect from the brake. It is to be understood that the brake system may be actuated by other than manual means; it is readily adapted to pneumatic, hydraulic, or other such means; or a combination of any several, either remotely or otherwise.

As the brake is released, the actuated end of the brake band is carried back away from the brake rim. This distance is limited by the rollers 27 and 25; as the brake is further released the rollers will cause the band to unwrap from the brake rim, thereby giving a positive release and definite clearance between the band and the brake rim. This combination of parts gives a positive release, a very decided advantage, which is not secured by the brake systems in present use. This positive release results in a gradual release of the brakes instead of the kick ordinarily encountered when the brakes are suddenly released.

The equalizing mechanism operates as follows: Assuming that a greater pressure is applied momentarily to one of the brake bands, that pressure will be transmitted through the band 8 to the strap 6 and bell crank 4, to the tie rods 10 and similarly through the other bell-crank to the strap 8 on the other brake band. This difference in pressure will result in an automatic adjustment of the tie rod mechanism and the bell-cranks such that the pressure will be equal on both bands.

Another feature of our invention is the safety brake system which results from the combination. In normal use, the brakes are adjusted so that the brakeshaft levers 19 will not touch the lugs 23 on the brake bands. If an accident should happen to the brake system, the anchored ends of the band would be free, with attendant loss of braking. However, with this system the levers 19 will rotate into contact with the lugs 23 so as to provide sufficient braking effect to prevent the drum from attaining abnormally high speeds, due to the weight hanging on the cable unwinding from the drums, and will prevent destruction of the machine, due to the bursting of rotative parts, due to abnormal centrifugal stresses.

Figure 2:
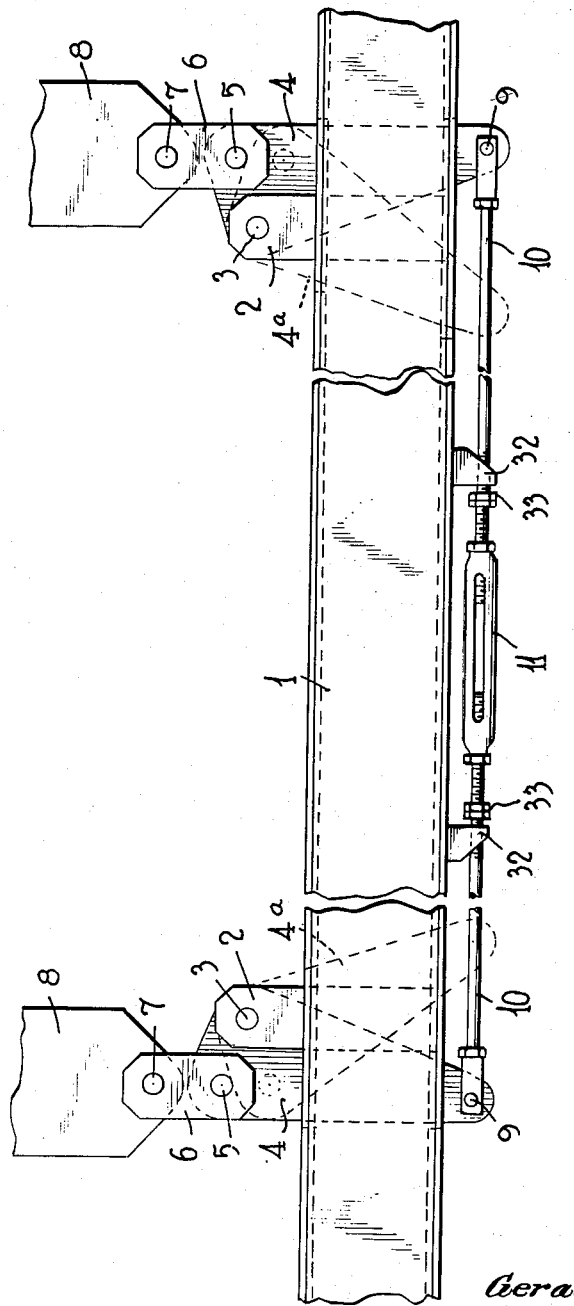
Figure 2 is a plan view of an equalizer mechanism and the equalizer support beam.

Another safety feature has been provided which is of considerable importance. With this arrangement, if either band 8, link 6, arm 4, pins 7, 5 or 9, tie rod 10, or turnbuckle 11 should break or become disconnected, the other band would automatically assume the load, and continue the braking effect. This is accomplished as follows: A stop lug 32 is fixed to the brake beam 1 on either side of the turnbuckle 11. The tie rod 10 moves through the stop lug; a stop-nut 33 is adjustably secured on the tie rods 10. In Fig. 2, on the left-hand end, if band 8 should fail, the bellcrank 4 would rotate counterclockwise toward dotted position 4a. This travel is limited, however. As the right tie rod 10 moves to the right, the stop-nut 33 also moves to the right until it strikes the stop lug 32. Continued pressure on the brake lever 30 will cause the right portion of the brake to continue the braking desired.

The equalizer system is provided and operates on the anchored end of the brake bands; it therefore equalizes the actual work being performed by each brake band, even if one band is slick or oily and the other is dry or sticky.

The arrangement of parts is connected so as to keep all pins in double shear, thereby reducing the size required. Loadings on the bellcrank and the support beam are evenly divided and balanced, which also allows the use of lighter parts. The ratio of the arms of the bellcrank 4 is proportioned so the pull on the tie rod is much less than the band pull. The tie rod is light because of the lesser pull and because it is in tension. If it were in compression, the size would have to be larger to resist the column effect on the tie rod. The turnbuckle is used on the tie rods to provide one point adjustment on the relative position of the anchored end of the bands to compensate for the wearing down of the frictional material used on the brakebands or brake rims. The adjustment is also used to change the compound leverage effect obtained in the linkage system on the actuated end of the bands. If the turnbuckle is loosened, the lever 19 and the compression link 21 will come more nearly into a straight line, in so doing the leverage is greatly increased.

To reiterate, some of the advantages of our invention are as follows:

The powerful self-energizing effect obtained from the compression actuating system with its simple but positive release, which clears the band easily from the brake rim. The self-energizing effect starts at the end of the band, instead of part way back on the band, as most systems do.

The double safety system which gives two different ways of keeping the machine in control, even if there is a failure of some part in the brake system. The travel limit stops on the tie rods would provide sufficient braking power to stop the machine, even if one brake failed. The other safety from the brake arm levers acting against the bands would not stop a heavily loaded machine, but would prevent excessive speeds, which might cause a rupture of parts with the attendant danger.

The double bellcrank equalizer requires much lighter parts and only one adjustment, as compared to the excessively heavy parts and at least two adjustments, as customarily used on most machines.

Both bands are fully equalized under all adjustments when brakes are applied.

While a specific embodiment of the invention has been described in detail, it is understood that the invention is not to be limited thereby but only by the appended claims.

What we claim is:

1. A brake system comprising a plurality of brake bands adapted to engage brake surfaces, means engaging said bands adjacent one end thereof for actuating said brakes, equalizing means connecting the other ends of said bands, said actuating means including an arm and a link pivotally connected to said arm and to one end of each of said bands and being adapted to apply the brakes to a limited extent through said arm upon failure of said link or its pivots.

2. A brake system comprising a brake band, a lug on said brake band, a brake surface, means for applying said band to said surface, said applying means comprising an arm, a link pivoted on said arm and on the lug on said band, said arm being constructed and arranged to engage said lug upon failure of said link or its pivot pins.

3. In a brake system having a brake and a braking surface, a wedge-shaped lug on said brake, an actuating arm, a link pivoted on said lug and said arm, said arm and said lug being so disposed that upon failure of said link or its pivot pins, said arm will apply pressure to said lug to apply the brake to said braking surface.

4. In a braking system having a pair of brake bands, a pair of bell cranks, the non-actuated end of one band being connected to an arm of one of said bell cranks, the non-actuated end of the other band being connected to an arm of the other bell crank, a beam having spaced stop lugs thereon, a tie rod arranged substantially parallel to said beam and connecting the other arms of said bell cranks, means for adjusting the length of said tie rod, and adjustable stops on said tie rod cooperable with said lugs to limit the movement of said tie rod relative to said beam.

5. A brake system comprising a brake band; a brake surface; means for applying said band to said surface; said means comprising an arm, a lug on said band, and means connecting said arm to said lug, said arm being constructed and arranged to engage said lug upon failure of said connecting means.

6. A brake system comprising a plurality of brake drums having brake surfaces, brake bands adapted to engage said brake surfaces, means engaging said brake bands adjacent one end thereof for actuating said brakes, equalizing means connecting the other ends of said brake bands, and rollers adjustably mounted at the actuated ends of said brake bands arranged to be engaged by said brake bands upon release of the brakes to limit the expansion of said brake bands and to effect a positive gradual release of said brake bands from said brake surfaces.

7. A brake system comprising a brake drum having a braking surface, a single brake band extending substantially around the entire periphery of said brake drum adapted to engage with said braking surface, means anchoring one end of said brake band, means connected with the opposite end of said brake band for actuating the same, rollers adjustably mounted at the actuated end of said brake band arranged to be engaged by said band upon release of the brake to limit the expansion of said band and to effect a positive gradual release of said band from said braking surface, and adjustable bolts for limiting the spacing of said brake band from said braking surface.

8. A brake system comprising a pair of brake drums, a brake band substantially surrounding each of said brake drums, a beam extending substantially parallel with the axis of said brake drums, a pair of bell cranks pivotally mounted upon said beam, one arm of the bell cranks being pivotally connected with one end of a brake band, means connecting the other arm of said bell cranks together and including a pair of rods, one rod being pivotally connected at one end with each of said bell cranks, and a turnbuckle connecting the other ends of said tie rods together, spaced stop lugs carried by said beam, an adjustable stop element carried by each of said rods and arranged intermediate said stop lugs, said stop elements being respectively adapted to engage a stop lug to maintain one of said brakes operative in the event of failure of the other of said brakes, and means connected with the opposite end of said brake bands adapted to actuate said bands to apply the brakes.

GERALD G. BROWN.
HARVEY DAVIDSON.